United States Patent [19]

Kato et al.

[11] Patent Number: 4,660,119
[45] Date of Patent: Apr. 21, 1987

[54] FLEXIBLE MAGNETIC DISK SHEET

[75] Inventors: Mikihiko Kato; Shigeo Komine; Kazuhiko Morita, all of Kanagawa, Japan

[73] Assignee: Fuji Photo Film Co., Ltd., Kanagawa, Japan

[21] Appl. No.: 683,294

[22] Filed: Dec. 18, 1984

[30] Foreign Application Priority Data

Dec. 19, 1983 [JP] Japan ................................ 58-239287

[51] Int. Cl.⁴ ...................... G11B 23/02; G11B 5/016
[52] U.S. Cl. ....................................... 360/133; 360/99; 360/135
[58] Field of Search .................... 360/133, 135, 99

[56] References Cited

U.S. PATENT DOCUMENTS

| 4,370,689 | 1/1983 | Davies | 360/135 |
| 4,480,282 | 10/1984 | Brock et al. | 360/135 |
| 4,499,516 | 2/1985 | Purdy et al. | 360/133 X |
| 4,523,246 | 6/1985 | Okuzawa | 360/133 |
| 4,581,270 | 8/1986 | Kato et al. | 428/65 |

Primary Examiner—John H. Wolff
Attorney, Agent, or Firm—Sughrue, Mion, Zinn, Macpeak, and Seas

[57] ABSTRACT

A flexible magnetic disk sheet having a central circular hole is described, through which an apparatus for reading and writing is engaged, and enclosed in an jacket having a larger central circular hole exposing the hole of the disk sheet within the hole of the jacket, wherein a reinforcing plastic ring containing a solid lubricating agent is provided on the region of the flexible magnetic disk sheet immediately surrounding the central circular hole thereof.

12 Claims, 7 Drawing Figures

FIG. 1A PRIOR ART
FIG. 1B PRIOR ART
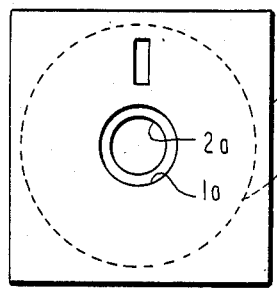
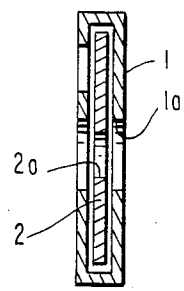
FIG. 2 PRIOR ART
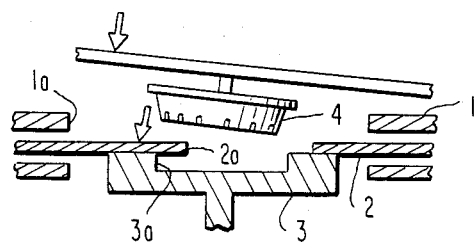
FIG. 3 PRIOR ART
FIG. 4 PRIOR ART
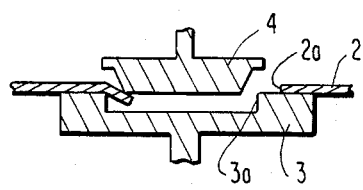
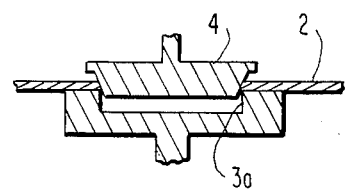
FIG. 5
FIG. 6
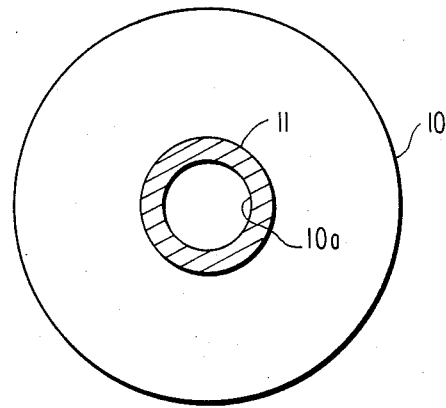
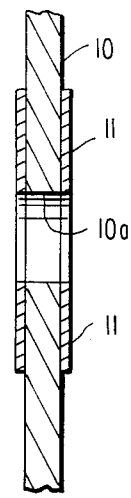

FLEXIBLE MAGNETIC DISK SHEET

FIELD OF THE INVENTION

The present invention relates to an improvement for flexible magnetic disks. More particularly, it relates to a flexible magnetic disk which can be loaded on writing and/or reading apparatus without eccentricity.

BACKGROUND OF THE INVENTION

Magnetic recording and playing of a magnetic signal in a flexible magnetic disk comprising a sheet in a jacket, involving connecting a sheet-position determining part of a writing and/or reading apparatus to a central circular hole of the jacket and sheet, and rotating the sheet, is known. For the sheet to be stored in the jacket, a space is provided in the magnetic disk which is slightly larger than the sheet, and thus the sheet sometimes moves to an eccentric position in the jacket during use or storage, with the result that the central circular hole of the sheet deviates from the position of a position-determining part (collet) of the apparatus when the disk is loaded on the apparatus, and the sheet may be supported at an eccentric position at the position determining time.

FIG. 1A and FIG. 1B illustrate this type of flexible magnetic sheet, located in a rectangular jacket 1 having circular open part 1a, with circular flexible magnetic sheet 2 having central circular hole 2a thereof exposed in the afore-mentioned central circular open part 1a, said sheet being stored in the jacket to allow free rotation.

Upon loading this flexible magnetic disk on the writing and/or reading apparatus, rotating part 3 (see FIGS. 2-4) of the position-determining part is fitted from under part of the sheet 2, and collet 4 is lowered from upper part of the sheet and is brought into the circular concave part 3a of rotating part 3 as shown in FIG. 2. At this time, the edge of central circular hole 2a does not always correspond to the position of circular concave part 3a of rotating part 3, and is many times out of proper alignment. If collet 4 is lowered in this state, some part of the portion surrounding the edge of circular hole 2a of the sheet 2 may be pinched between collet 4 and concave part 3a of rotating part 3, such that the sheet rotates eccentrically. Writing and reading cannot be carried out correctly unless magnetic disk sheet 2 rotates while being correctly centered corresponding to the central rotating axis, such eccentric pinching should very desirably be prevented. Moreover, there exists another problem, viz., that rattling occurs during rotation due to the absence of planarity of the sheet when it is supported and rotated under such an eccentric pinched state.

Upon connecting the sheet 2 by lowering the collet 4, it is necessary that the portion surrounding the edge of the central circular hole of the sheet possesses an appropriate hardness, and that the friction coefficient ($\mu$) between the sheet 2 and collet 4 as well as between the sheet 2 and rotating part 3 is small, in order that the sheet 2 is lowered correctly as shown in FIG. 4, not as shown in FIG. 3.

It has been described that in order to solve the above problem, a reinforcing ring and be fixed at the region of sheet 2 immediately surrounding the central circular hole thereof, for example, in U.S. Pat. No. 4,052,750 and Japanese Patent Application (OPI) No. 28302/75 (the term "OPI" as used herein mean a "published unexamined Japanese Patent Application").

However, such a technique has not been found to sufficiently reduce the friction coefficient and fully satisfactory effects cannot be obtained.

SUMMARY OF THE INVENTION

An object of the present invention is to provide a flexible magnetic disk sheet fixed with a reinforcing ring having a low friction coefficient and which can be engaged with a reading and writing apparatus in alignment therewith.

Based on extensive research, it has now been found that the friction coefficient of a reinforcing ring can be minimized and satisfactory effects can be obtained by the use of a reinforcing ring made of plastic containing a solid lubricating agent.

Therefore, the present invention is to provide a flexible magnetic disk sheet with a central circular holes through which an apparatus for reading and writing is engaged, enclosed in a jacket with a larger central circular hole exposing the hole of the disk sheet within the hole of the jacket, wherein a reinforcing plastic ring containing a solid lubricating agent is provided on the region of the flexible magnetic disk sheet immediately surrounding the central circular hole thereof.

BRIEF DESCRIPTION OF THE DRAWINGS

FIG. 1A is planar view showing an example of a flexible magnetic disk according to the invention.

FIG. 1B is its cross-section.

FIG. 2 is a partial cross-sectional view showing the loading of a flexible magentic disk on a position-determining part of the apparatus.

FIG. 3 is a partial cross-sectional view showing a case of loading wherein the sheet is supported eccentrically.

FIG. 4 is a partial cross-sectional view showing a case of loading wherein the sheet is correctly position-determined.

FIG. 5 is a planar view showing a sheet part of an example of the invention.

FIG. 6 is a cross-sectional view of a central portion of FIG. 5.

In FIGS. 1A thorugh 6, 1 is a jacket, 1a is an open hole in the jacket, 2 and 10 is a magnetic sheet, 2a and 10a each is a central circular hole, 3 is a position-determining part (ratating part), 3a is a circular concave part, 4 is a position-determining part (collet), and 11 is a reinforcing ring.

Plastics which are preferaby used for a reinforcing ring according to the present invention include nylon 6, nylon 66, nylon 12, polyethylene terephthalate (PET), a phenol resin, an epoxy resin, a polyacetal resin, a polyphenylene sulfide resin, a polycarbonate, and a polytetrafluoroethylene. Especially preferred are nylon 6, nylon 66, nylon 12, and polyethylene terephthalate.

The solid lubricating agents in the present invention are preferably graphite, molybdenum disulfide, tungsten disulfide, boron nitride, graphite fluoride, metal oxides (e.g., a lead monooxide, molybdenum trioxide, silicon dioxide, and the like), silicon nitride, and a metal (e.g., lead, copper, zinc, and the like). Of these, molybdenum disulfide, tungsten disulfide and graphite fluoride are preferred, and molybdenum disulfide is more preferred. The solid lubricating agents generally have an average particle size of from 0.1 to 10$\mu$, preferably from 0.2 to 5$\mu$ and more preferably from 0.3 to 4$\mu$. These solid lubricating agents and their properties are described in detail in *Solid Lubricant Hand-Book,* published by Saiwai Shobo in 1978.

The content of the solid lubricating agent is from 1 to 50 parts by weight, and preferably from 5 to 10 parts by weight, per 100 parts by weight of the plastic. After mixing the lubricating agent in the plastic, a plastic sheet is prepared by a heat-melted biaxially film stretching method. Reinforcing materials or filling materials such as glass fiber, carbon fiber, copper powder or gummetal powder can be added thereto.

A plastic sheet is punched circularly to form a reinforcing ring.

The present invention is explained in more detail by the accompanying drawings.

FIG. 5 shows one embodiment of the present invention where an circular-shaped reinforing ring 11 is fixed to both side surfaces of the flexible magnetic disc sheet 10 at the edge region of its central circular hole 10a. The thickness of the reinforcing ring is generally from 1 to 100 μm, preferably from 2 to 50 μm, and more preferably from 5 to 20 μm. If the thickness is over 100 μm, the center of the written data track may be displaced from the center of rotation of the rotary portion during handling operations.

The method for fixing the reinforcing ring 11 to the sheet 10 is a conventionally known method such as a bonding method using an adhesive for example, synthetic polymer adhesives such as phenol resins, epoxy resins, vinyl acetate resins and acryl resins, with acryl resins being preferred, or a welding method using heat or high frequency.

The present invention is illustrated in more detail by the following examples and comparative examples.

EXAMPLE 1

100 parts by weight of polyethylene terephthalate (PET) and 10 parts by weight of $MoS_2$ (trade mark "Molysulfide", manufactured by Climax Molybdenum Co., Ltd.; average particle size in diameter: 0.3 μm) were mixed and prepared a 20 μm-thick polyethylene terephthalate (PET) sheet by a heat-melted biaxially film stretching method. The sheet was circularly punched to a width of 3 mm to coincide with the diameter of the central circular hole 10a of the flexible magnetic disk sheet 10 having a diameter of 5.25 inches. The reinforcing ring was provided on both side surfaces of the magnetic disk sheet coated uniformly with 0.5 g/m² of an acryl resin adhesive (using methyl ethyl ketone as a solvent), followed by drying at room temperature for 30 minutes. Thus, a magnetic flexible disk sheet attached with a reinforcing ring was produced.

EXAMPLE 2

The same procedure as in Example 1 was repeated except that nylon 66 was used instead of poyethylene terephthalate (PET) to prepare a magnetic flexible disk sheet attached with a reinforcing ring.

EXAMPLE 3

The same procedure as in Example 1 was repeated except that $WS_2$ (average particle size in diameter: 2 μm) was used instead of $MoS_2$ to prepare a magnetic flexible disk sheet attahed with a reinforcing ring.

EXAMPLE 4

The same procedure as in Example 1 was repeated except that graphite fluoride (average particle size in diameter: 0.5 μm) was mixed instead of $MoS_2$ to prepare a magnetic flexible disk sheet attached with a reinforcing ring.

COMPARATIVE EXAMPLE 1

The same procedure as in Example 1 was repeated except that only polyethylene terephthalate (PET) was used, without $MoS_2$, to prepare a magnetic flexible disk sheet attached with a reinforcing ring.

COMPARTIVE EXAMPLE 2

A flexible magnetic disk sheet was prepared without attachment of a reinforcing ring.

The friction coefficient with upper and lower position determining parts in the afore-mentioned examples and comparative examples was measured, and loading test on disk drive was conducted under the conditions of 25° C., 80% RH, and 40° C., 80% RH.

The results are shown in the Table below.

Measurement of the friction coefficient (μ value) was conducted by rubbing the magnetic sheet with position-determining part (collet) at a rate of 0.8 mm/sec under additional weight of a 70 g weight using a strain gauge "UT-IK" made by NMB Co. The friction coefficient with position-determining part (rotating part) was measured similarly.

The drives used for loading tests on disk drives were YD-280 and 380 made by Y-E Data Co.; JA 751 and 561 made by Matsushita Tsuko Co.); and M-2894 and 4853 made by Mitsubishi Electric Co.

The results are shown by an A for cases in which the disk was correctly loaded on all drives, and by a B for cases in which the disk was uncorrectly loaded on more than one drive upon repeated loadings, i.e., ten times on each drive.

TABLE

| | 25° C., 80% RH | | | 40° C., 80% RH | | |
|---|---|---|---|---|---|---|
| | Friction coefficient (μ) of disk sheet | | Loading test of disk sheet with rotating part | Friction coefficient (μ) of disk sheet | | Loading test of disk sheet with rotating part |
| | With collet | With rotating part | | With collet | With rotating part | |
| Example 1 | 0.28 | 0.23 | A | 0.34 | 0.27 | A |
| Example 2 | 0.38 | 0.27 | A | 0.40 | 0.29 | A |
| Example 3 | 0.31 | 0.25 | A | 0.36 | 0.30 | A |
| Example 4 | 0.32 | 0.27 | A | 0.37 | 0.30 | A |
| Comparative Example 1 | 0.45 | 0.31 | B | 0.50 | 0.40 | B |
| Comparative Example 2 | 0.55 | 0.43 | B | 0.65 | 0.53 | B |

It is clear from examples and comparative examples that the reinforcing ring of the present invention can provide the low friction coefficient, even at a high temperature and at a high humidity, and exhibits remarkably excellent results in the engagement test.

While the invention has been described in detail and with reference to specific embodiment thereof, it will be apparent to one skilled in the art that various changes and modifications can be made therein without departing from the spirit and scope thereof.

What is claimed is:

1. A flexible magnetic disk sheet having a central circular hole, (through which an apparatus for reading and writing is engaged,) and enclosed in a jacket having a larger central circular hole exposing the hole of the disk sheet within the hole of the jacket, wherein a reinforcing plastic ring containing a solid lubricating agent is provided on the region of the flexible magnetic disk sheet immediately surrounding the central circular hole thereof.

2. A flexible magnetic disk sheet as in claim 1, wherein the plastic forming the reinforcing plastic ring is selected from the group consisting of nylon 6, nylon 66, nylon 12, polyethylene terephthalate, a phenol resin, an epoxy resin, a poyacetal resin, a polyphenylene sulfide resin, a polycarbonate, and a polytetrafluoroethylene.

3. A flexible magnetic disk sheet as in claim 2, wherein the solid lubricating agent is selected from the group consisting of graphite, molybdenum disulfide, tungsten disulfide, boron nitride, graphite fluoride, a metal oxide, silicon nitride, and a metal.

4. A flexible magnetic disk sheet as in claim 3, wherein the solid lubricating agent is mixed in an amount of from 1 to 50 parts by weight per 100 parts by weight of the plastic forming the reinforcing plastic ring.

5. A flexible magnetic disk sheet as in claim 3, wherein the solid lubricating agent is mixed in an amount of from 5 to 10 parts by weight per 100 parts by weight of the plastic forming the reinforcing plastic ring.

6. A flexible magnetic disk sheet as in claim 3, wherein the thickness of the reinforcing ring is from 1 to 100 $\mu$m.

7. A flexible magnetic disk sheet as in claim 3, wherein the thickness of the reinforcing ring is from 2 to 50 $\mu$m.

8. A flexible magnetic disk sheet as in claim 1, wherein the solid lubricating agent is selected from the group consisting of graphite, molybdenum disulfide, tungsten disulfide, boron nitride, graphite fluoride, a metal oxide, silicon nitride, and a metal.

9. A flexible magnetic disk sheet as in claim 1, wherein the solid lubricating agent is mixed in an amount of from 1 to 50 parts by weight per 100 parts by weight of the platic forming the reinforcing plastic ring.

10. A flexible magnetic disk sheet as in claim 1, wherein the solid lubricating agent is mixed in an amount of from 5 to 10 parts by weight per 100 parts by weight of the plastic forming the reinforcing plastic ring.

11. A flexible magnetic disk sheet as in claim 1, wherein the thickness of the reinforcing ring is from 1 to 100 $\mu$m.

12. A flexible magnetic disk sheet as in claim 1, wherein the thickness of the reinforcing ring is from 2 to 50 $\mu$m.

* * * * *